United States Patent [19]

Mathison et al.

[11] Patent Number: 5,546,991
[45] Date of Patent: Aug. 20, 1996

[54] INFLATABLE FABRIC BAG PLUG

[75] Inventors: Allen D. Mathison, Richfield; Randy D. Smith, New Hope, both of Minn.

[73] Assignee: Cherne Industries Incorporated, Minneaplois, Minn.

[21] Appl. No.: 460,255

[22] Filed: Jun. 2, 1995

[51] Int. Cl.⁶ ............................................. F16L 55/12
[52] U.S. Cl. .............................. 138/93; 138/89
[58] Field of Search ............................ 138/93, 89, 90, 138/91, 94

[56] References Cited

U.S. PATENT DOCUMENTS

| | | | |
|---|---|---|---|
| 628,726 | 7/1899 | Schultz | 138/93 |
| 1,760,750 | 4/1928 | Goodman. | |
| 1,906,151 | 4/1933 | Goodman | 138/93 |
| 3,276,481 | 10/1966 | Mcnulty | 138/93 |
| 3,357,193 | 12/1967 | Fitzgibbon, Jr. | 138/89 |
| 3,414,140 | 12/1968 | Feldkamp | 214/10.5 |
| 3,431,945 | 3/1969 | Robillard | 138/90 |
| 3,990,872 | 11/1976 | Cullen | 55/274 |
| 4,076,872 | 2/1978 | Lewicki et al. | 138/93 |
| 4,079,755 | 3/1978 | Van der Lans | 138/93 |
| 4,273,605 | 6/1981 | Ross | 138/89 |
| 4,449,584 | 5/1984 | Christensen | 138/91 |
| 4,565,222 | 1/1986 | Lundman | 138/45 |
| 4,627,470 | 12/1986 | Carruthers | 138/93 |
| 4,883,094 | 11/1989 | Vetter | 138/89 |

OTHER PUBLICATIONS

Cherne Industries Incorporated, CHERNE Single–Size TEST–BALL Plug, 1992, Product Sheet, 1 page.

*Primary Examiner*—Frankie L. Stinson
*Assistant Examiner*—James F. Hook
*Attorney, Agent, or Firm*—Anthony G. Eggink

[57] ABSTRACT

An inflatable fabric bag plug for sealing low pressure pipelines. The bag plug has a body portion constructed of a coated fabric material and includes a plug body portion, main seam cap strips, first and second end seam cap strips and a plurality of sealing strips which are bonded over all internally and externally exposed fabric edges to prevent leakage when the plug is inflated. The body portion has first and second end closures and opposing tethering assemblies which are bonded over the end closures and to the plug body portion. An inflation assembly and a pressure gauge assembly are provided for inflating and deflating the plug as well as monitoring the plug during use. Bypass assemblies are provided to permit the passage of fluids through the bag plug when inflated in a pipeline.

20 Claims, 6 Drawing Sheets

INFLATABLE FABRIC BAG PLUG

BACKGROUND OF THE INVENTION

This invention relates to a pneumatic plug device and more particularly to an inflatable fabric bag plug device. The fabric bag plugs of the present invention are used to seal low-pressure pipes or conduits that convey fresh water, natural gas, petroleum products, and other low-pressure fluids.

Although fabric bag plugs have been proposed and used in the past, several shortcomings have continually existed with the structures of these plugs. For example, prior art plugs made of fabric material have not been found to be sufficiently abrasion and puncture resistant to be suitable for extended use in a construction environment. Further, such bag plugs have been limited in usage range in that their diameters upon inflation have been restricted as to expansion. Due to the composition and structure of the prior art devices, it has also been difficult to maneuver and secure such fabric plugs in a pipeline. For example, tethering structures have been found inappropriate to use with prior art devices because their respective structural integrities may be compromised when the plugs are subjected to full usage pressures in a pipeline.

It has also been found difficult to manufacture prior art fabric bag plugs that are leak resistant on a consistent basis. It has been found, for example, that the fiber structure in the fabric material used to manufacture bag plugs may result in the development of slow leaks upon inflation of the bag plugs. The leak cause has been found to be the wicking action set up by the fiber configuration in the fabric material utilized. The fiber configuration itself, therefore, creates escape paths along the fibers of the fabric material to permit air from the interior of the plug to leak from the inflated plug body. Therefore, it has been found difficult and costly to consistently manufacture a prior art plug that prevents leakage at the fabric edges upon the inflation of the plug due to the air channels that form in the fabric weave. The bag plug structure of the present invention overcome the shortcomings of the prior art plugs.

The present invention differs from the prior art in its structure and in the materials used in its structure. The plug body of the present invention utilizes at least one plug body fabric portion, although multi-portion body configurations may be utilized in accordance with the teachings of the invention to provide leak resistant plugs. The utilization of rectilinear flexible portions and sealing strips in the bag plug of this invention provides a means to assembly a plug with less stringent tolerances than those required in the assembly of prior art devices.

An adhesive, and preferably a contact adhesive, is used to bond the fabric to form the plug body, and importantly, capping strips are bonded over both the interior and exterior seams of the plug body. The cap strips are bonded in a manner to cover all fabric edges to prevent the leakage caused by the air channels set up in the fabric weave upon plug inflation. The materials of construction of the present invention result in a leak resistant, inflatable fabric plug device that may be constructed in an efficient and consistent manner. The resultant plug structure overcomes the difficulty and shortcomings of the prior art devices.

The object of the present invention is to provide an inflatable fabric bag plug that is leak resistant and suitable for use in low-pressure pipelines. It is also an object of this invention to provide a light-weight, foldable, easy to handle, inexpensive to manufacture fabric bag plug which is usable in low pressure pipelines and which is accessible through small access ports.

SUMMARY OF THE INVENTION

The present invention relates to an inflatable fabric bag structure used in low pressure conduits. The inflatable plug of the invention is constructed of a flexible, coated and fluid impervious material. The inflatable plug has a plug body constructed of a plurality of coated fabric portions which are bonded together to provide a plug body having a generally rectilinear configuration when in its deflated state. Further provided are a plurality of seal strips of a specified fluid impervious material which are bonded over the interior and exterior seams of the plug body. An inflation assembly and a pressure gauge assembly are provided to permit the inflation and deflation of the plug body and to permit the monitoring of the bag plug during use.

A tethering assembly is bonded to each opposing end of the plug body. Each tethering assembly has predetermined dimensions with respect to the dimensions of the plug body. Each tethering assembly further has opposing panels which are used to receive the inflation assembly and the pressure gauge assembly and optionally a bypass assembly for use with the bag plug.

A plurality of sealing ribs are transversely and circumferentially bonded about the plug body to sealingly engage the inside surface of a pipeline in which the bag plug is utilized. Further, the present invention provides the utilization of selected fabric materials and adhesive compositions for producing leak resistant fabric bag plugs. The flexible fabric utilized for the bag plug, i.e., nylon coated fabric, allows for expansion (i.e., 10%) so that use of the plug in varying pipeline structures can be accommodated.

These and other benefits of this invention will become clear from the following description by reference to the drawings.

DESCRIPTION OF THE PREFERRED EMBODIMENTS

FIGS. 1–4 show the fabric bag plug 10 in an inflated state, whereas FIGS. 5–11 show the fabric bag plug 10 in a deflated state. FIGS. 12–15 show an alternate embodiment generally shown as plug 11, wherein a bypass assembly is mounted to and through the plug body 18.

The fabric bag plugs of this invention may be constructed in a range of sizes to thereby seal pipelines in a range of diameters. For example, the fabric bag plugs may be constructed to seal pipeline diameters ranging from approximately 6 inch to 144 inch diameters. To provide proper sealing and frictional requirements, the larger the diameter of the plug, the body length of the plug is accordingly longer in length. The back pressure holding capability of the bag plugs of this invention is generally inversely proportional to the plug body diameter.

Figure 1:
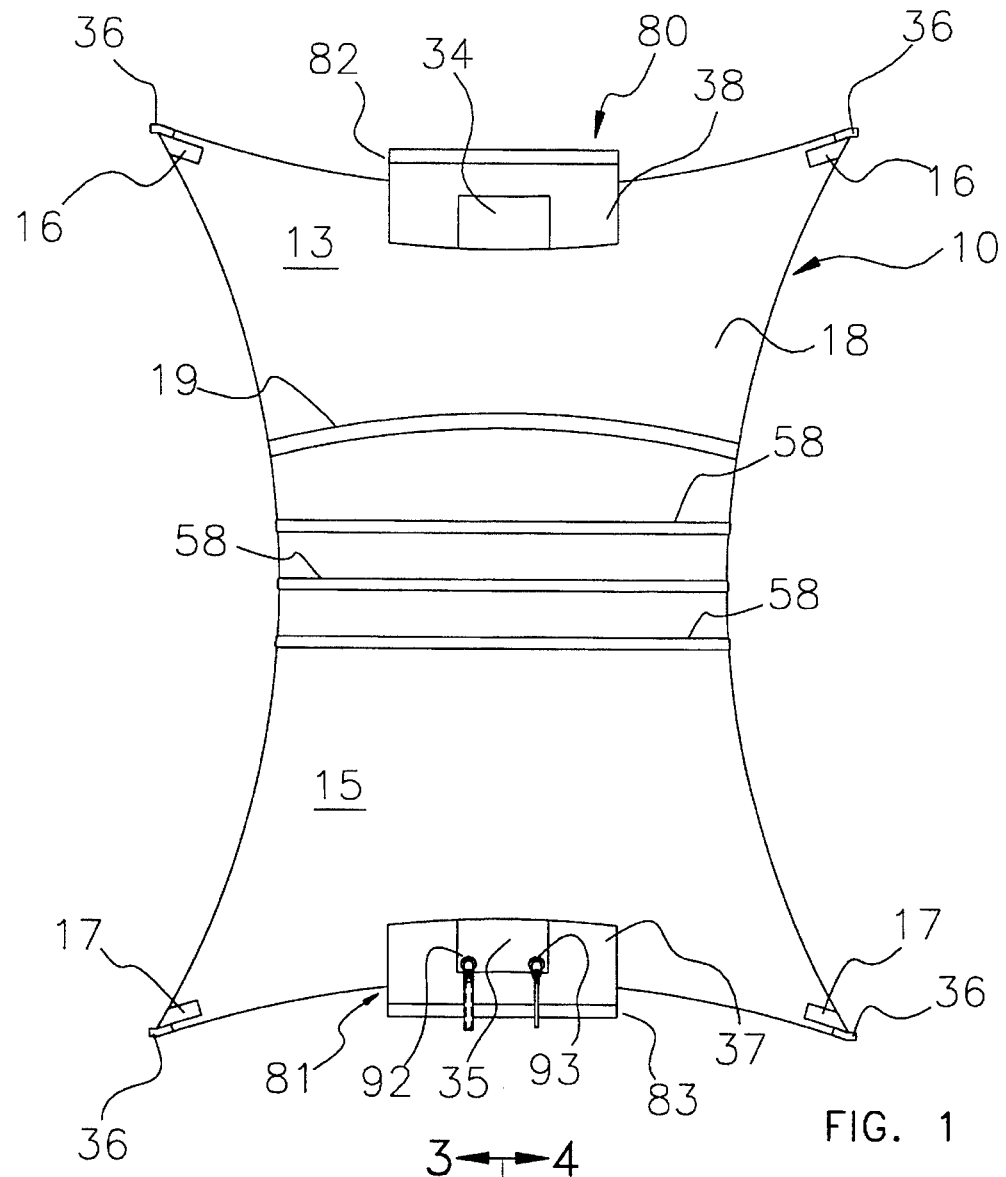
FIG. 1 is a top plan view of an inflated fabric bag plug in accordance with the teachings of the present invention.
Figure 2:
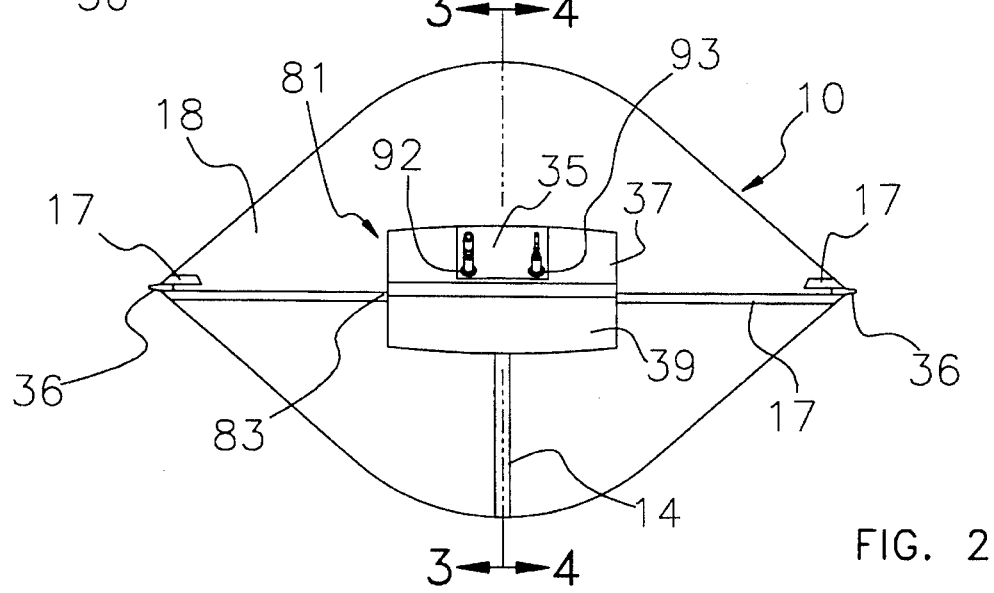
FIG. 2 is an end view of the inflated fabric bag plug of FIG. 1.

As shown in FIGS. 1 and 2, the fabric bag plug 10 has a plug body 18 which is comprised of a first body portion 13 and a second body portion 15 and which are circumferentially united at a location shown covered by the body seam cap strip 19. The plug body 18 has a main seam cap strip 14 wherein a generally rectilinear sheet of flexible material has been joined to form a tubular configuration. It is within the purview of this invention to have a seamless tubular structure and to have a plug body 18 composed of a single body portion.

The fabric bag plug 10 has opposing ends which are comprised of bonded and folded over body portion ends which are sealed by first and second end seam cap strips 16 and 17. Shown circumferentially disposed about the midsection of the plug body 18 are three sets of sealing ribs 58 which engage the interior surface of a pipeline. Shown bonded to the opposing ends of the plug body 18 are first and second tethering assemblies 80 and 81. The tethering assemblies 80 and 81 are utilized for attachment to cables or the like for maneuvering and positioning the bag plug 10 within a pipeline.

The tethering assembly 80 has a first tether patch 38 optionally a reinforcement patch 34 and a tether attachment tube 82 which is bonded within the tether patch. The tethering assembly 81 has a second tether patch which is a unitary member having panels 37 and 39. The first tether patch 38 being similarly configured. The second tether patch 35 also has a tether attachment tube 83 fixed at the folded end for purposes described above. Bonded onto the tether patch panel 37 is a casting reinforcement patch 35 through which ports 92 and 93 are mounted. The ports 92 and 93, as will be further described, are constructed and arranged to respectively receive inflation means and a pressure gauge for operating the fabric bag plug 10. Shown at the four corners of the plug body 18 are wear strips 36 which comprise strips of flexible material which are folded and bonded to the respective outside corners of the plug body 18 for protection against damage and wear as the plug 10 is maneuvered in a pipeline.

Figure 3:
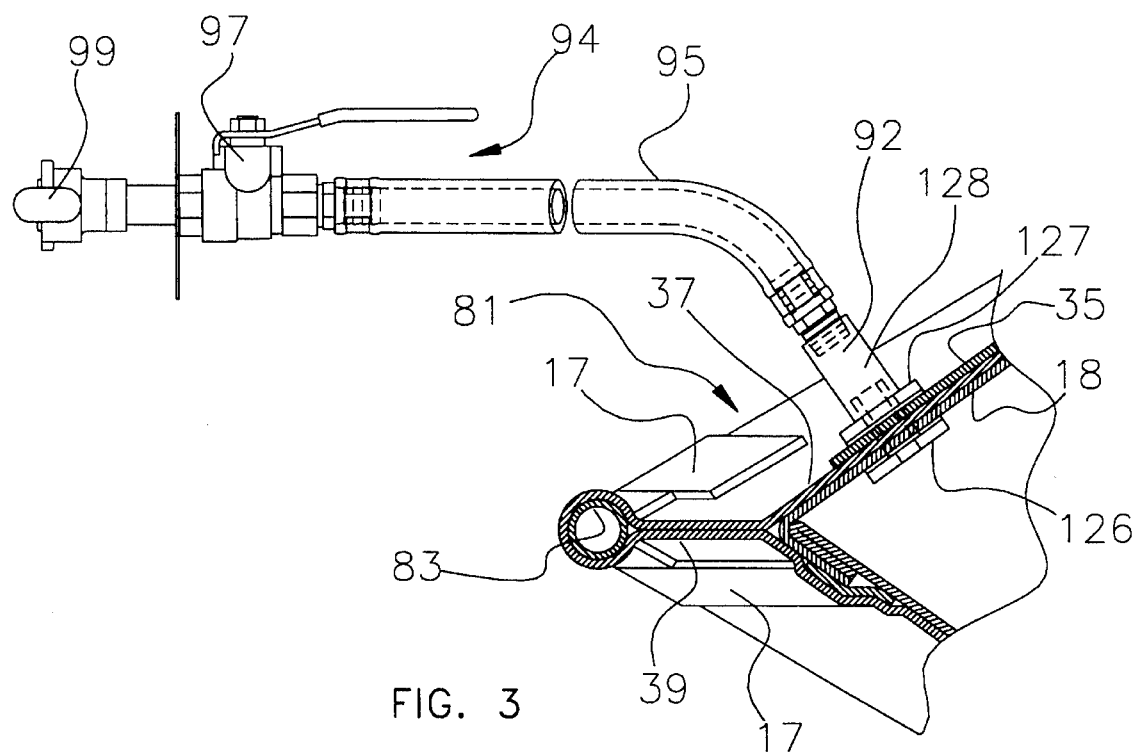
FIG. 3 is a sectional view taken along line 3—3 of FIG. 2.
Figure 4:
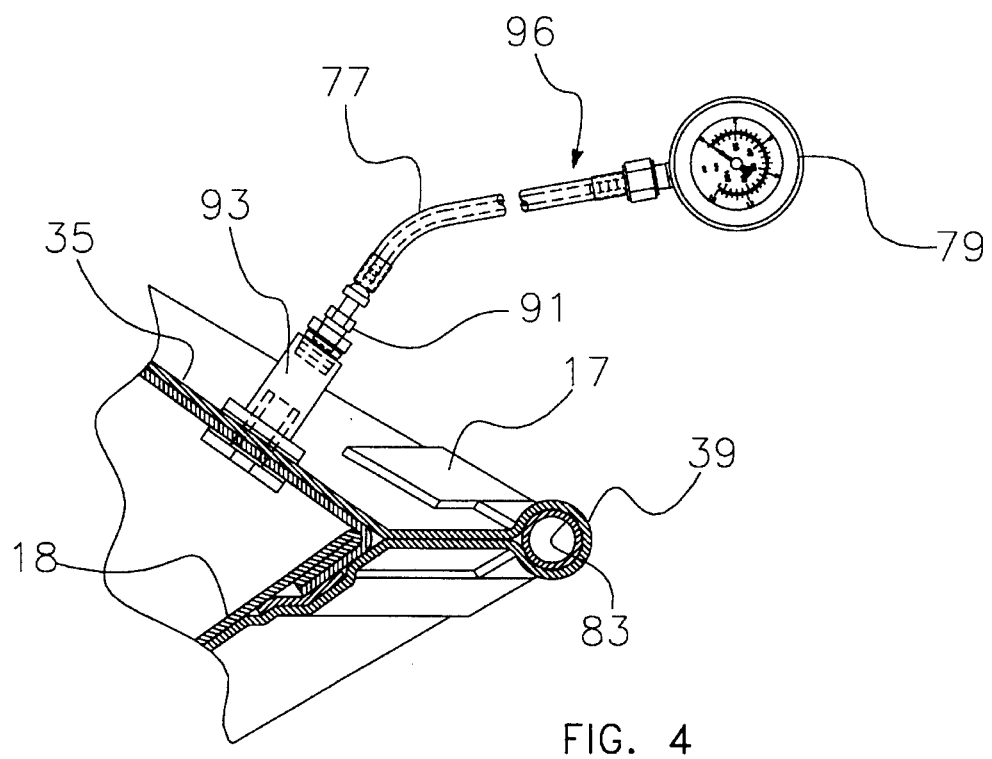
FIG. 4 is a sectional view taken along line 4—4 of FIG. 2.

Referring to FIG. 3, the end of the plug body 18 is shown in detail and particularly shows the tethering assembly 81 and the mounted port 92 to which an inflation assembly 94 is attached. The inflation assembly 94 is shown to comprise a hose 95, a valve 97 and a coupling/inflator 99 to which a compressed air source may be connected, for example. As also shown, the port 92 is comprised of a threaded bulkhead 126, a washer 127 and a coupling 128 which are sealingly attached to and through the flexible layers of 35, 37 and 18. FIG. 4 shows port 93 having a gauge assembly 96 attached thereto. The gauge assembly 96 is comprised of a snifter valve 91, a hose 77 and a pressure gauge 79. The assembly 96 is provided so that the pressure of bag plug 10 may be monitored during inflation and use. The port 93 is shown sealingly attached to the plug body 18 in the same manner as the port 92.

In summary, FIGS. 1–4 show an inflatable fabric bag plug 10 constructed of a plurality of coated fabric portions and sealing or cap strips. The fabric bag plug 10 includes a plug body portion 12, an exterior main seam cap strip 14, and first and second end seam cap strips 16 and 17. The plug body 18 is formed from united plug body portions 13 and 15. The plug body 18 is shown to have a body seam cap strip 19 and a main seam cap strip 14. As will be further described, the interior seams of the bag plug body 18 are similarly sealed with cap strip members.

Figure 5:
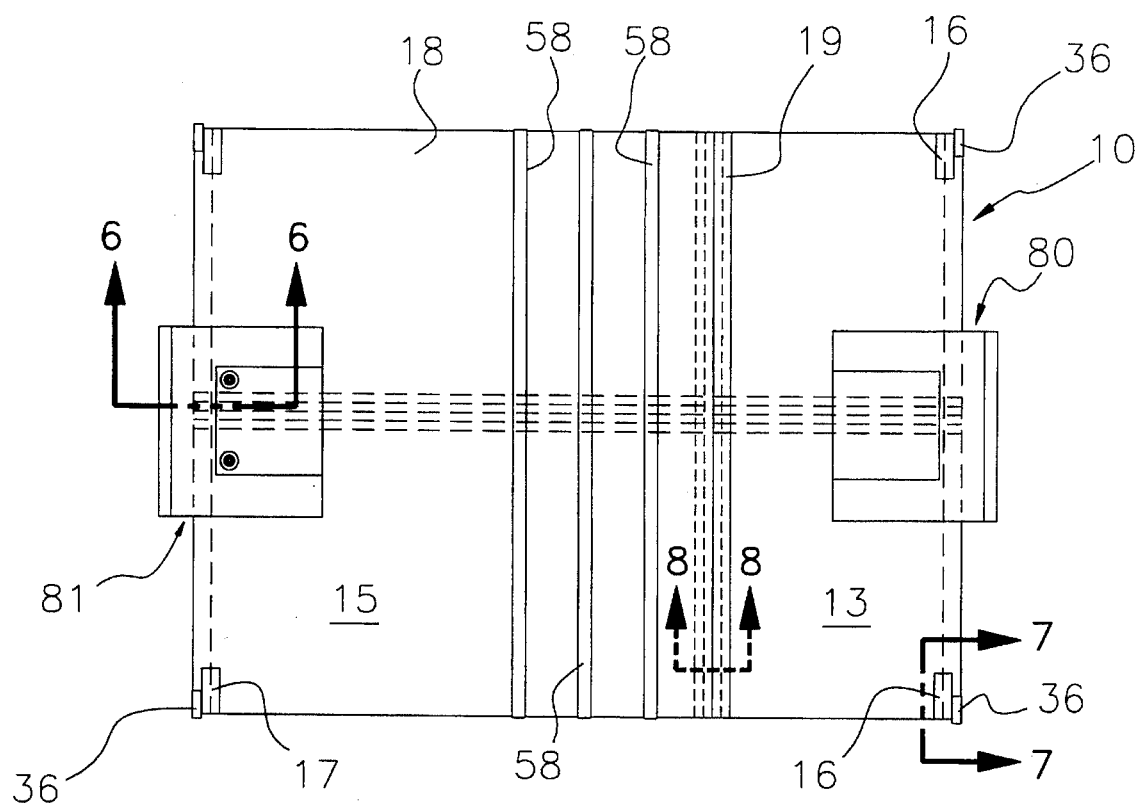
FIG. 5 is a top plan view of the fabric bag plug of FIG. 1 in a deflated state.

FIGS. 5–11 show the inflatable bag plug 10 in its deflated state. As shown, the bag plug 10 is comprised of a plurality of rectilinear portions and strips and when inflated forms a pillow like configuration as shown in FIGS. 1 and 2. FIG. 5 is a top view of the bag plug 10 and showing the first and second body portions 13 and 15, the outside body seam cap strip 19, the sealing rib extrusions 58 mounted thereon, the first and second end seam cap strips 16 and 17, the body corner wear strips 36 and the first and second tethering structures 80 and 81. Importantly, the width of the tethering structures 80 and 81 is dependent upon the width of the plug body 18. It has been found that the width, or the dimension along the end of the tether structures 80 and 81 be within a range of 25–40% of the plug body width. This dimensional range has been found to enable the tethering structures 80 and 81 to suitably distribute pulling forces without damage to the plug body 18 and without diminishing the maneuverability of the plug 10 within a pipeline.

Figure 6:
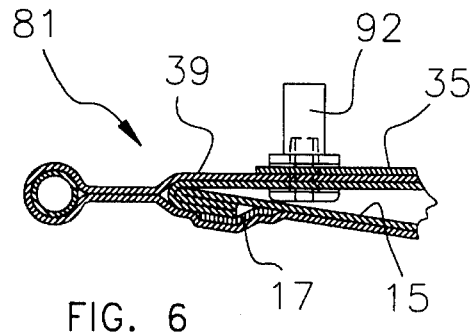
FIG. 6 is a sectional view taken along line 6—6 of FIG. 5.
Figure 7:
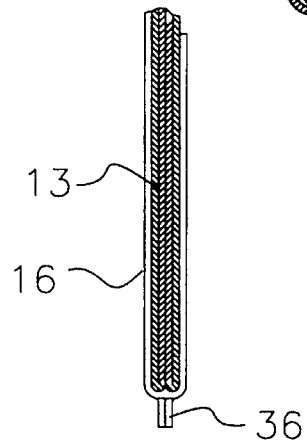
FIG. 7 is a sectional view taken along line 7—7 of FIG. 5.
Figure 8:
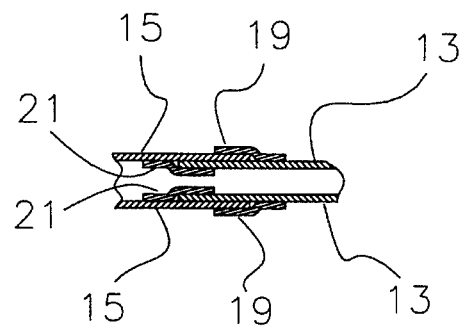
FIG. 8 is a sectional view taken along line 8—8 of FIG. 5.

FIG. 6 is a sectional view showing the attachment of the second tethering structure 81 to the plug body end. Further shown is the sealed plug body end configuration having the seam cap strip 17 covering the bonded and folded over plug body end. FIG. 7 is a sectional view of the plug body corner and showing the folded and bonded body end, the seam cap strip 16 and wear strip 36. FIG. 8 is a sectional view showing the bonded plug body portions 13 and 15, as well as the inside body seam cap strip 21, and the outside body seam cap strip 19.

Figure 9:
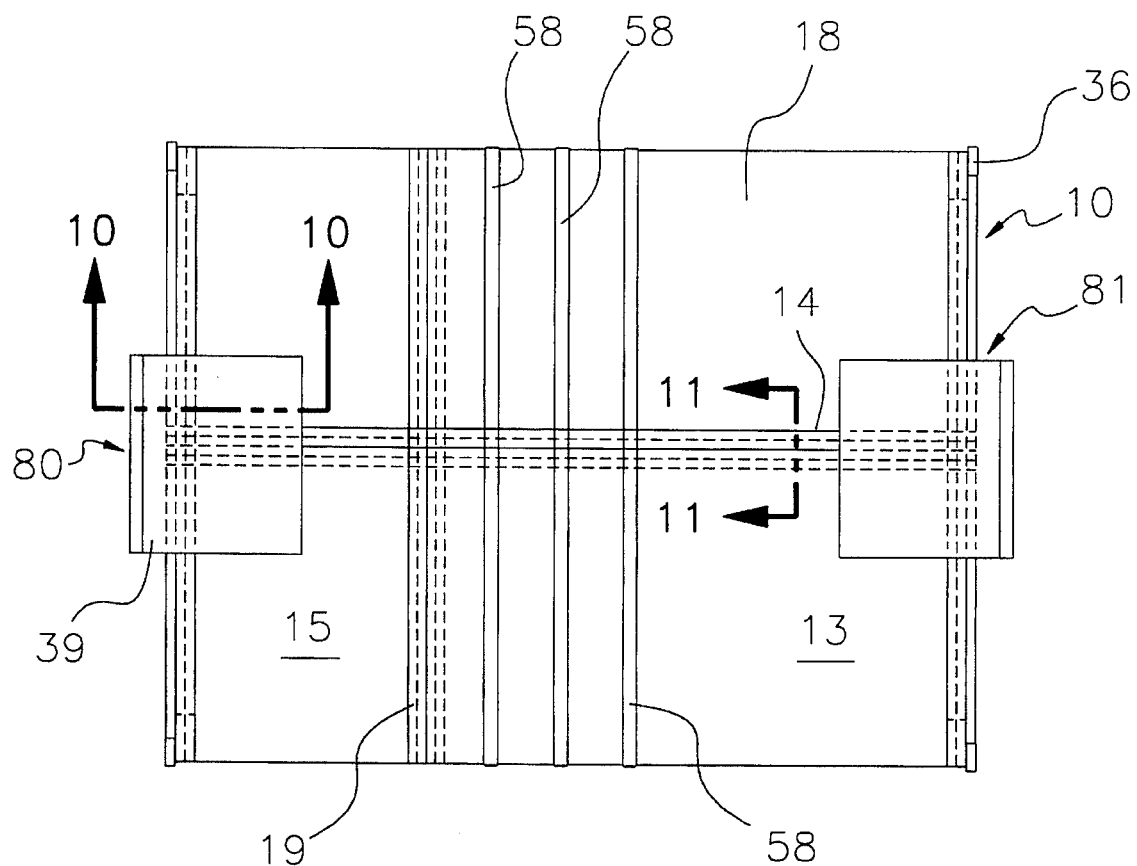
FIG. 9 is a bottom plan view of the fabric bag plug of FIG. 5.
Figure 10:
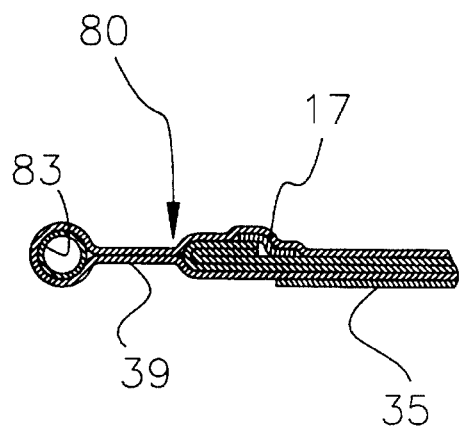
FIG. 10 is a sectional view taken along line 10—10 of FIG. 9.
Figure 11:
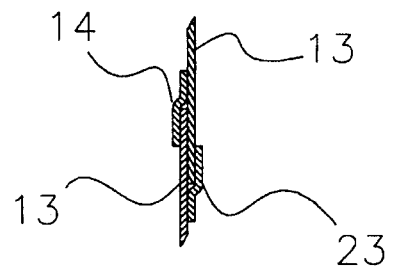
FIG. 11 is a sectional view taken along line 11—11 of FIG. 9.
Figure 12:
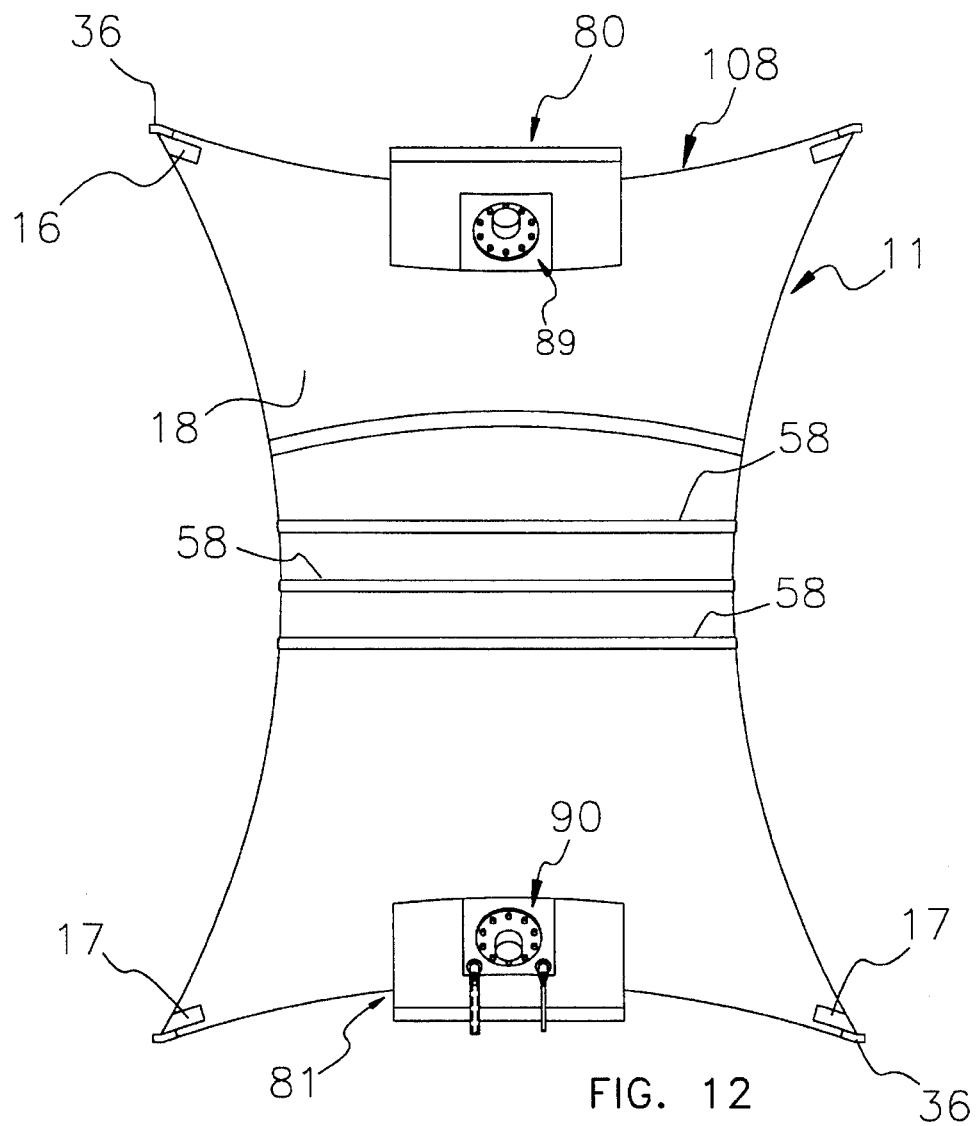
FIG. 12 is a top plan view of an alternate embodiment of a fabric bag plug in an inflated state.
Figure 13:
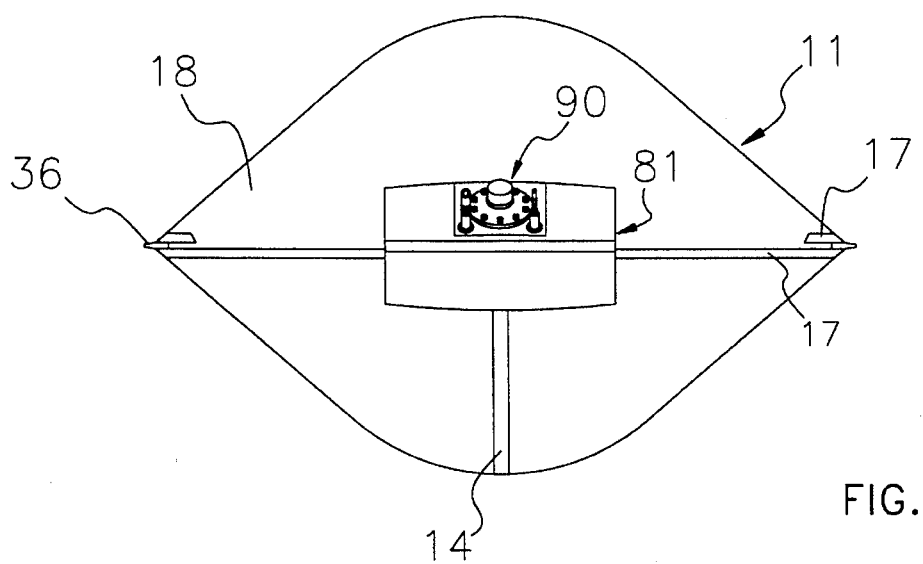
FIG. 13 is an end view of the fabric bag plug of FIG. 12.

FIG. 9 is a bottom view of the fabric bag plug 10 and showing the outside main seam cap strip 14 and the attachment of the tethering structures 80 and 81. FIG. 10 shows a sectional view of the main seam of the plug body. FIG. 11 is a sectional view showing the inside main seam cap strip 23 and the outside main seam cap strip 14 bonded to body portion 13 of the plug body 18.

Figure 14:
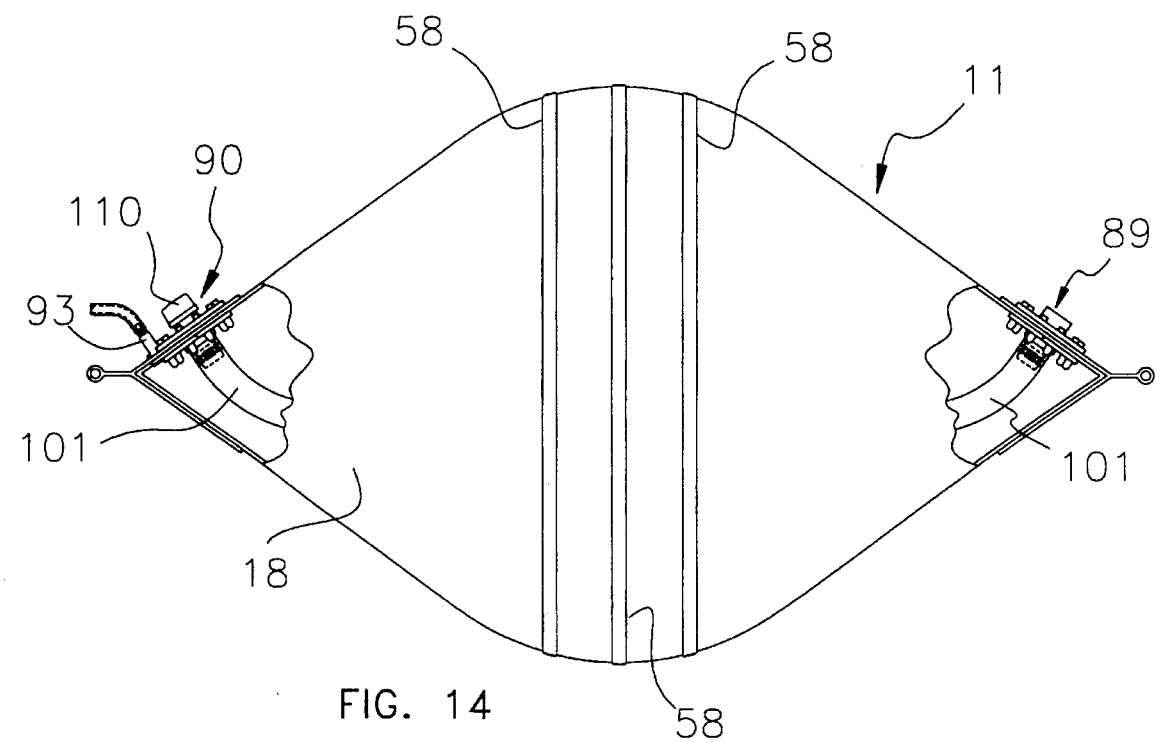
FIG. 14 is a side plan view of the fabric bag plug of FIG. 12.
Figure 15:
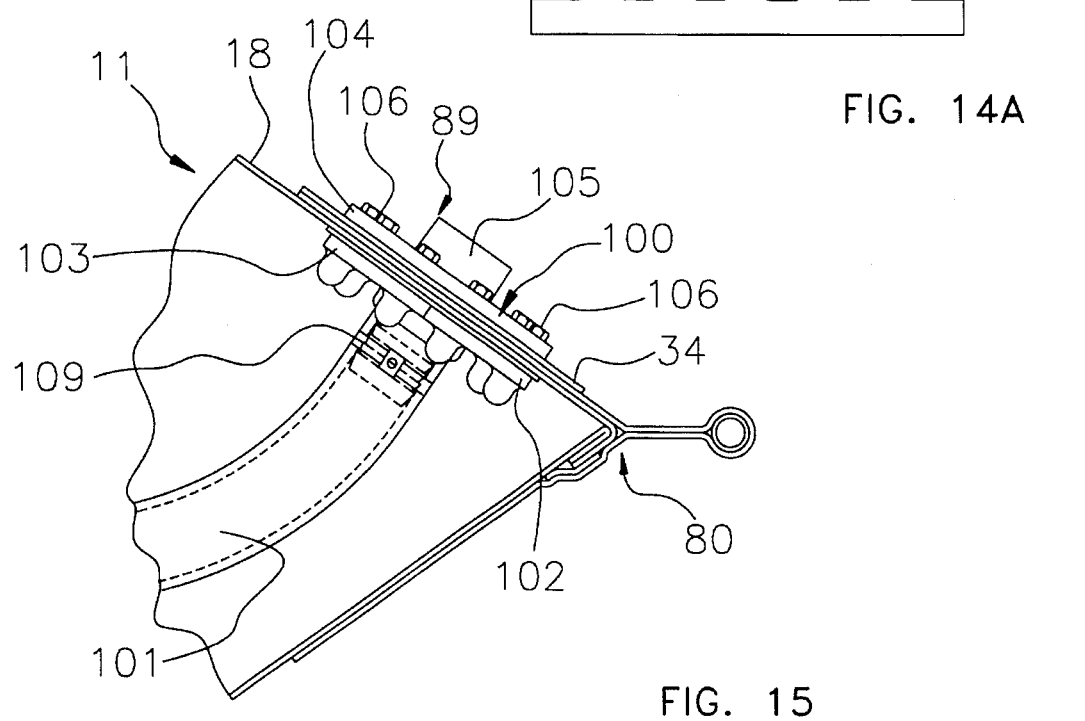
FIG. 15 is a sectional view of the fabric bag plug end of FIG. 14.

FIGS. 12–15 show the bag plug embodiment 11 which has a bypass assembly to permit fluids to pass therethrough while the plug is sealingly positioned in a pipeline. As shown, the plug body 18 is formed of a single fabric body portion. The plug body 18 has a bypass assembly 89 installed at one end and a bypass assembly 90 installed at the opposite end. As shown in FIG. 14, a flexible hose 101 extends through the interior of the plug body 18 and connects the bypass assembly 89 to the bypass assembly 90. Bypass assembly 90 is further shown to have a cap 110. FIG. 15 is a sectional view of the bypass assembly 89. As shown, the assembly 89 is comprised of a casting member 100 and inside casting members 102 and 103. The inside casting member 102, 103 forms a split member which is connected to the outside member 100 by cap screws 106. Further shown, is the connection of the flexible hose 101 to the bypass port 105 by means of connector 109.

Figure 14A:
FIG. 14A is a sectional plan view of the sealing rib extrusion.

FIG. 14A is a cross-sectional view of one sealing rib extrusion 58 and showing a plurality of individual tapered sealing rib members 59 extending upwardly from the rib extrusion base 57. Thus, a variable combination of extrusions 58 and sealing rib members 59 may be utilized generally about the midsection of the plug. Preferably as shown, three such extrusions 58, each with five rib members 59 are utilized on the plugs, however, such use is dependent upon plug size.

It is important that the inflatable fabric bag plugs of the invention are lightweight, foldable, abrasion and puncture resistant, economical in structure and manufacture, leak resistant, flexibly expansible and capable of being tethered to withstand the usage pressures of a low pressure pipeline. The bag plugs are foldable to fit through small openings, i.e., 18 inches in diameter. The fabric utilized in the present invention is preferably of a nylon construction continuously coated on both sides with an elastomer, such as a urethane, PVC or the like. For example, such urethane coated nylon fabric preferably has a minimum tensile strength of 600 lbs/inch$^2$ and having a minimum coating adhesion of approximately 25 lbs per inch$^2$. The cap strip material is preferably a clear polyurethane material having a thickness of 20 mil., for example. The cap strip material is preferably 2 inches in width and provided in roll form. The adhesive utilized in the construction of the plug is preferably a two part adhesive, for example having a polyurethane base. The activator utilized with the adhesive is of a cooperating chemical composition.

In the preferred embodiment, an adhesive, and preferably a contact adhesive as set forth above, is utilized to bond the various elements of the plug to thereby form the inflatable fabric bag plug. However, it is anticipated that other bonding compositions and related methods may also be used in accordance with the teachings of the present invention.

The fabric elements include a plug body portion 12 having an inside surface 24, an outside surface 26, a first main edge 28, a second main edge 30 and first and second end edges 32. A main seam cap strip 14 is longer than the length of the plug body portion 12, and first and second end seam cap strips 16 are longer than the width of the plug body portion 12. In addition, a first and second casting reinforcement patch 34, a set of four wear strips 36, and two tether patches 38 may optionally be cut and bonded diagonally across the fabric to increase their strength, however, a normal directional cutting pattern has been found suitable. The fabric used for the plug body portion 12 and the casting reinforcement patch 34 is preferably urethane coated nylon, and the fabric used for the main seam cap strip 14 and the first and second end seam cap strips 16 is preferably 20 mil clear urethane. The utilization of the clear urethane material is its chemical and structural similarity with the coating of the nylon fabric material. Further, the clarity of the material permits the assembler to visualize the adhesive covering the various seams and to thereby ensure proper bonding and placement of the cap strips with respect to the seams to be covered.

The rib extrusions 58 are preferably composed of a urethane composition to provide a suitable coefficient of friction with respect to the interior surface of a pipeline. The rib extrusions 58 are spaced and positioned at generally the mid-section of the plug body. The rib extrusions preferably have a Shore A durometer range between 50–60 and are utilized to seal the bag plug within and in conformance with any small irregularities in the pipeline surface. As shown in FIG. 14A, each rib extrusion is shown to have a plurality of parallel individual sealing ribs which extend outwardly for engagement with a pipeline.

The end seam cap strip 16 is bonded symmetrically over the end seam 22. Wear strips 36 are shown bonded over the corner edges of the plug body. The tethering structures 80 and 81 are used for inserting and removing the plug 10 from a pipeline. Tether attachment tubes 82 and 83 are captured and bonded within the tether patches 38 and 39. The tether attachment tubes 82 and 83 are rigid tubular members preferably constructed of a metallic composition. However, other attachment structures may be utilized.

Ports 92 and 93 are provided for receiving an inflation assembly 94 and a gauge assembly 96, respectively, and are shown mounted on reinforcement patch 35. The bypass assemblies 89 and 90 consist of casting assemblies 100 that are respectively connected by a flexible hose 101. Each casting assembly 100 has inside casting members 102, 103 and outside casting member 104, and a plurality of casting screws 106. The inside casting members 102 and 103 are inserted inside of the plug body 18 and are screwed to the outside casting member 104 through the mounting hole pattern 98. The casting screws 106 are preferably tightened to approximately seventy foot-pounds of torque.

A casting reinforcement patch 34 is bonded to the tether patch 38 which is bonded to the plug body 18. A mounting hole pattern 98 is provided for each casting assembly 100 and which extends through the casting reinforcement patch 34, each tether patch 38, and the plug body 18. The outside casting member 104 is fastened through the mounting hole pattern 98 to the inside casting members 102 and 103, which forms a split assembly. The casting screws 106 are tightened to approximately seventy foot-pounds of torque. The split casting members 102 and 103 are utilized to permit the individual members to be easily manipulated with respect to the plug body for assembly purposes.

The rib extrusions 58 are of a predetermined size and are bonded circumferentially about generally the center of plug body 18. The rib extrusions 58 are composed of urethane and form a seal with the interior of a pipeline.

As many changes are possible to the embodiments and methods of this invention utilizing the teachings thereof, the descriptions above, and the accompanying drawings should be interpreted in the illustrative and not the limited sense.

That which is claimed is:

1. An inflatable plug for sealing low pressure pipelines comprising:

(a) a plug body having opposing ends and being constructed of a plurality of coated woven fabric elements of a predetermined construction and configuration and having exposed woven fabric ends, said plug body further having a plurality of seams exposing said woven fabric ends, said plug body having a generally rectangular configuration when in its deflated state;

(b) means to bond said coated woven fabric elements to form said plug body;

(c) means to seal said plurality of seams to thereby seal said exposed woven fabric ends of said coated woven fabric elements;

(d) an inflator assembly mounted to and being in communication with said plug body for inflating and deflating said plug; and (e) a plurality of sealing ribs transversely bonded about generally the midsection of said plug body.

2. The inflatable plug of claim 1, further having tethering means bonded to said opposing ends of said plug body, said tethering means having a predetermined width.

3. The inflatable plug of claim 1, wherein said plurality of coated woven fabric elements include at least one plug body portion, a first and a second end seam cap strip and wherein said sealing strips include a main seam cap strip of a second flexible material.

4. The inflatable plug of claim 3, wherein said plug body has a flat tubular configuration in its deflated state and having an overlapped body main seam, said main seam cap strip being bonded over and under said body main seam, said flat tubular body configuration having opposing ends and further being folded at said opposing ends, said first and second end seam cap strips respectively being bonded over said opposing ends.

5. The inflatable plug of claim 3, wherein said plug body portion is comprised of a urethane coated nylon fabric of a predetermined strength and wherein said main seam cap strip is a clear urethane material and said first and second end seam cap strips are comprised of a urethane coated nylon fabric of generally the same strength as said body portion.

6. The inflatable plug of claim 1, wherein said means to bond is comprised of a contact adhesive.

7. The inflatable plug of claim 1, further comprising a bypass assembly having a first port, a second port and a flexible conduit joining said first and second ports, said first port being connected at one end of said plug body and said second port being connected at said opposite end of said plug body, said flexible conduit being disposed in the interior of said plug body.

8. The inflatable plug of claim 1, wherein said plug body is comprised of a plurality of united plug body portions forming body seams and wherein body seam cap strips are bonded over said body seams.

9. The inflatable plug of claim 1, wherein said plug body has four corners and wherein a wear strip is bonded about each said plug body corner.

10. An inflatable fabric bag plug comprising:

(a) a plurality of generally rectilinear coated fabric elements each having a peripheral edge and being of predetermined dimensions, said fabric elements including a plug body portion, a main seam cap strip, and a first and a second end seam cap strip, said fabric elements further having a woven fabric interior layer whereby said woven fabric is exposed at the element edges;

(b) means for inflating the plug; and (c) a tubular plug body being formed from said plug body portion, said plug body having a main seam, a first and a second end seam, and an inside and an outside surface, said main seam and said first and second end seams exposing said woven fabric interior layer on said outside surface of said tubular plug body, said main seam cap strip being bonded over the main seam, the first end seam cap strip being bonded over the first end seam, and said second end seam cap strip being bonded over the second end seam, said main seam and first and second end seam cap strips being constructed and arranged to cover said exposed fabric edges of said fabric to result in said plug body being leak resistant.

11. The inflatable fabric bag plug of claim 10, wherein said plug body has a first end and a second end, said bag plug further comprising a bypass assembly having a first casting assembly mounted at said first end of said plug body, and a second casting assembly at the second end of said plug body, a flexible hose extending within and through said plug body, whereby said bypass assembly provides fluid communication means through said plug.

12. The inflatable fabric bag plug of claim 10, wherein a flexible tethering assembly is bonded over said first end seam and said second end seam of said plug body, each said tethering assembly being a generally rectilinear configuration and having opposing panels, each said panel being bonded over each said end seam and to said plug body, each said tethering assembly further having a tether support mounted at its terminal end.

13. The inflatable fabric bag plug of claim 12, wherein said bag plug has a predetermined width and wherein each said tethering assembly has a predetermined width and further wherein said tethering assembly width is 25–40% of said plug body width in its deflated state.

14. The inflatable fabric bag plug of claim 11, wherein said plurality of coated fabric elements further comprises a first and second casting reinforcement patch, wherein one said casting reinforcement patch is bonded to each said tethering assembly, wherein a mounting hole pattern extends through at least one said casting reinforcement patch, whereby the casting reinforcement patch strengthens said plug body around said casting assembly and wherein a plurality of pipeline sealing ribs are transversely bonded about generally the midsection of said plug body.

15. The inflatable fabric bag plug of claim 12, wherein said fabric plug body and said casting reinforcement patch are composed of a urethane coated nylon fabric having predetermined strength and wherein said main seam cap strip is composed of a clear urethane material and said first and second end seam cap strips are composed of a urethane coated nylon material.

16. The inflatable fabric bag plug of claim 10, wherein said plurality of fabric elements further include four wear strips, wherein said plug body has a first end closure corresponding to said first end seam, and a second end closure corresponding to said second end seam, wherein said first and second end closures have a pair of corner edges and wherein said wear strips are bonded over the corner edges to thereby protect the plug body from damage due to abrasion.

17. A lightweight, flexible and foldable bag plug for sealing a conduit and having a generally rectilinear configuration in a deflated state and a pillow configuration in its inflated state comprising:

(a) a bag body having generally rectilinear dimensions, having a predetermined width and being constructed of a flexible multi-layered material comprising a coated fabric material of a predetermined tensile strength and an inner coating and an outer coating of a fluid impervious material and having a fabric layer therebetween;

(b) said bag body being comprised of at least one body portion having at least one body seam and opposing end seams;

(c) a plurality of sealing strips bonded to said at least one body seam and said opposing end seams on the interior and the exterior of said plug body;

(d) a pair of tethering assemblies, each said tethering assembly having opposing panels bonded to the bag body, one said tethering assembly being bonded to the respective ends of said bag plug body, each said tethering assembly being approximately centrally positioned along said predetermined width of said bag body; and (e) at least one port extending into said plug body for inflating, deflating and monitoring the inflation pressure of said plug.

18. The flexible bag plug of claim 17, wherein said tethering assembly width is 25–40% of said bag body width in its deflated state.

19. The flexible bag plug of claim 17, wherein a bypass assembly is installed in said bag body, said bypass assembly comprising a pair of inner castings, a pair of external castings and a flexible hose connecting said inner castings.

20. The flexible bag plug of claim 17, wherein said plug body has four corners and wherein a wear strip is bonded to each said corner and wherein a plurality of pipeline sealing ribs are transversely bonded about generally the midsection of said plug body.

* * * * *